UNITED STATES PATENT OFFICE.

CLEM J. BURKLEY, OF COLUMBUS, OHIO, ASSIGNOR TO GENERAL ELECTRIC COMPANY, A CORPORATION OF NEW YORK.

INSULATING MATERIAL.

1,306,520.     Specification of Letters Patent.     Patented June 10, 1919.

No Drawing.     Application filed December 6, 1917. Serial No. 205,843.

*To all whom it may concern:*

Be it known that I, CLEM J. BURKLEY, a citizen of the United States, residing at Columbus, in the county of Franklin, State of Ohio, have invented certain new and useful Improvements in Insulating Materials, of which the following is a specification.

The present invention comprises a new asphaltic material having special utility as an insulating material, particularly as an ingredient in varnishes for fabric insulation in which flexibility, high insulating properties and permanence at elevated temperatures are necessary properties.

According to this invention the asphaltic material is produced by mixing a natural asphalt or asphaltic of high and definite flow point, such for example as gilsonite, with a viscous mineral oil, such for example, as cylinder oil, and blowing a gas, such as air through the mixture while heated until a material of the desired physical properties is produced.

One method of preparing the compound for use according to my invention is, as follows:

About five parts of gilsonite and about six parts of cylinder oil, both by weight, are heated in a suitable receptacle. When the temperature reaches about 175° C., air or other oxidizing gas is blown through the mixture at a pressure of about ten pounds, and as the blowing proceeds the temperature of the material is increased as rapidly as possible to 255° C. which is maintained until the end of the operation. The blowing with air is continued for about three hours at which time the flow point of the material should be about 150 to 160° C. If desired, flow point measurements may be made at this time and if it is found that the flow point is still lower than desired, the blowing should be continued for short periods until the desired results are obtained.

The resulting product is a tough, plastic, homogeneous material with a dull luster, cheesy fracture and a characteristic odor of petroleum. The blowing not only raises the flow point above the value which the mixture of the ingredients would have without the air blowing, but in my opinion there takes place also an oxidizing reaction in the material. Air blowing also causes some loss of weight due to carrying away some of the more easily volatile constituents of the mixture.

What I claim as new and desire to secure by Letters Patent of the United States, is:—

1. A process which consists in mixing an asphaltic material with a mineral oil, heating the mixture and blowing the same with air until the product when cooled is a tough, homogeneous material with a cheesy fracture.

2. A process which consists in mixing gilsonite with cylinder oil, heating to produce a melt, blowing air through the mixture for several hours while maintaining the temperature above the fusing point to produce a material having a flow point of about 150 to 160° C., which when cooled will be a tough, homogeneous solid having a dull luster and cheesy fracture.

3. The process which consists in mixing gilsonite with a mineral oil, heating the mixture to a temperature high enough to produce a uniform melted mass, and blowing an oxidizing gas, through the mixture until the product when cooled has a flow point substantially higher than said mixture would have without blowing.

4. A material comprising a mixture of asphaltic material and mineral oil, said mixture having been blown with an oxidizing gas, said material having a flow point substantially higher than said mixture would have without blowing, and being characterized by a dull luster and cheesy fracture.

5. An electrical insulating material comprising a mixture of about five parts gilsonite and about six parts cylinder oil by weight, said mixture having been blown with air until its flow point has been substantially raised.

6. An electrical insulating material comprising an air-blown mixture of about five parts gilsonite and about six parts mineral oil by weight, and having a dull luster, cheesy fracture and a flow point of about 150 to 160° C.

In witness whereof, I have hereunto set my hand this 3rd day of December 1917.

CLEM J. BURKLEY.